United States Patent [19]

Long

[11] 4,242,561
[45] Dec. 30, 1980

[54] ELECTRIC SEAM WELD MONITORING APPARATUS AND METHOD

[75] Inventor: George Long, Philadelphia, Pa.

[73] Assignee: Crown Cork & Seal Company, Inc., Philadelphia, Pa.

[21] Appl. No.: 10,029

[22] Filed: Feb. 7, 1979

[51] Int. Cl.$^3$ ............................................. B23K 11/00
[52] U.S. Cl. ..................................... 219/109; 219/64; 219/86.41
[58] Field of Search ..................... 219/61.5, 64, 82, 83, 219/86.41, 108, 109, 110

[56] References Cited

U.S. PATENT DOCUMENTS

| 3,389,239 | 6/1968 | Treppa et al. | 219/110 |
| 3,632,949 | 1/1972 | Thorne | 219/64 |

FOREIGN PATENT DOCUMENTS 1790335  6/1976  Fed. Rep. of Germany ............. 219/64

Primary Examiner—C. C. Shaw
Attorney, Agent, or Firm—Woodcock, Washburn, Kurtz, Mackiewicz & Norris

[57] ABSTRACT

An improved weld monitoring apparatus and a method for its use are disclosed. Specifically, the invention relates to the application of integrating voltmeters to the monitoring of a resistance seam welding process applicable to cans and the like, wherein a blanking pulse generator is used to direct a voltage signal from the welding process to suitably adapted integrating voltmeters.

5 Claims, 3 Drawing Figures

4,242,561

ELECTRIC SEAM WELD MONITORING APPARATUS AND METHOD

FIELD OF THE INVENTION

This invention relates to the control of welding apparatus by measuring the voltage across the electrodes. More specifically, the apparatus of the invention and the method of its use are directed towards the control of resistance welding apparatus in which overlapping metal seams are welded together by the application of electric power via rollers concurrently with the application of pressure. The invention has general applicability to many applications of welding of this type; however, the invention will be described specifically as related to the manufacture of cans for the containing of liquids or foods or other products inasmuch as that is the application for which the invention was first developed.

BACKGROUND OF THE INVENTION

The manufacture of cans is at present commercially accomplished in a variety of ways. One of the more common methods is to roll a sheet of flat steel, ordinarily coated on both sides with a thin layer of tin, into a cylinder and weld up the resulting seam. Commonly the edges of the steel sheet are overlapped slightly to form the seam. This weld can be performed in a variety of ways. Possibly the most common is through resistance welding, where the can is passed between a pair of electrically energized rollers, thus causing a current to flow between the overlapped edges forming the seam. If pressure is applied to the rollers, they essentially flatten out the overlapping edges so that the cylinder thus formed is essentially uniform in wall thickness around its circumference. Ends may then be applied to the can by conventional techniques.

One form of welding machine which is of great utility in such welding processes is that marketed under the name "Soudronic." This machine is available in a variety of models. Essentially, it is a large electric motor driving a generator which produces an AC current of on the order of 2,000 amperes at 18 volts, which has, naturally, a pulsed waveform. This sort of waveform when applied to seam welding of cans produces a "stitching" effect whereby the weld is produced not by a continuous application of electrical energy and pressure, but by pulsed application of the electrical energy. Thus the weld, if examined microscopically, exhibits a long series of joined tiny welds.

It will be apparent that it is essential to the manufacture of a can which is leak-proof that the weld be of continuous and perfect integrity throughout its length. Furthermore, it will be appreciated that according to modern production methods, such cans in order to be economically manufactured must be made at very high rates of speed, on the order of 300 per minute. Therefore, the weld process must be developed to the point that it is reliable, efficient and susceptible of very high speed application. While the Soudronic machine is capable of welding cans in accordance with the above requirements, it will be appreciated that it is no simple matter to set the machine up to perform at such specifications. Furthermore, once the proper settings of the machine controls have been achieved, there remains the problem of testing the seams as they are manufactured since it is highly desirable to remove poorly welded cans from the production process before they go any further. Therefore, a need exists in the art for an improved weld monitor method which will detect defective welds at the weld point so that the cans do not have to be subjected to further leak tests at a later stage in the production line. Ideally, in a "stitching" weld application as described above every stitch would be monitored.

OBJECTS OF THE INVENTION

It is, therefore, an object of the invention to provide a weld monitor system which can monitor the weld as it is being welded.

It is a further object of the invention to provide a weld monitor system which can efficiently and reliably test every stitch of every weld on every can at the time the can is welded.

Another object of the invention is to provide a method for monitoring welds as they are made.

Yet another object of the present invention is to provide a method whereby continuous seam welds of cans can be monitored as the cans are being welded.

A further object of the invention is to provide a weld monitoring method which is capable of monitoring each individual stitch in a stitch welding application.

Finally, an object of the present invention is to provide a method and apparatus whereby the welds performed on cans may be monitored during the welding operation and associated apparatus and a method for removing poorly welded cans from the production line, based on the monitoring results, without operator intervention.

SUMMARY OF THE INVENTION

The present invention satisfies the needs of the art and the objects listed above by its provision of at least one integrating voltmeter, used in conjunction with a blanking pulse generator, to measure the voltage developed across the welding electrodes which in turn is used to indicate the integrity of each weld, and to use the output of this voltmeter to provide an error signal which will remove poorly welded cans from the production line.

BRIEF DESCRIPTION OF THE DRAWINGS

The invention will be better understood by reference to the accompanying drawings in which.

DESCRIPTION OF THE PREFERRED EMBODIMENTS

Figure 1:
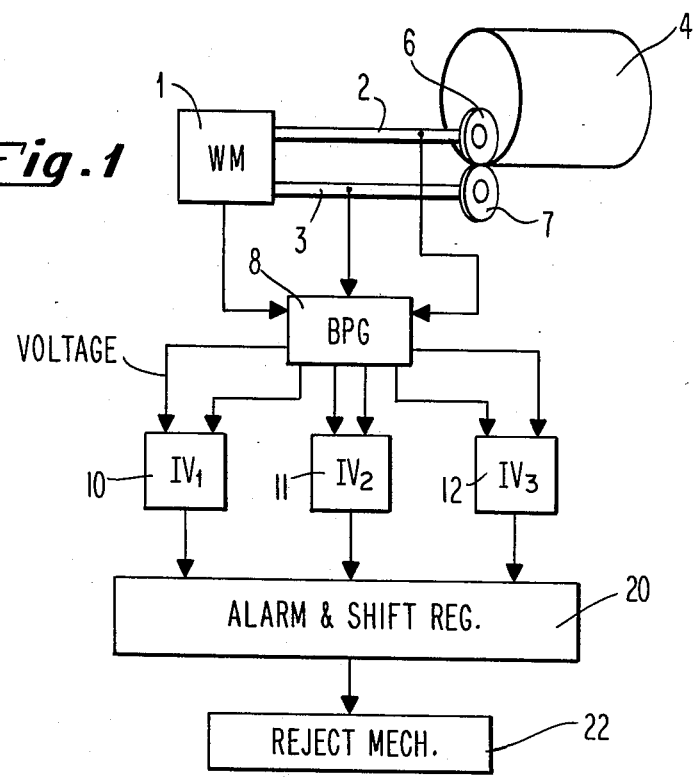
FIG. 1 represents a schematic view of one embodiment of the present invention.

As discussed above, the present invention relates to a method and apparatus for monitoring the continuous seam welding of cans. FIG. 1 is a schematic representation of apparatus which is suitable for the practice of the process of the invention. A welding machine 1, such as the Soudronic unit described above, supplies current to a can to be welded 4 via arms 2 and 3 on which are carried current rollers 6 and 7. The can 4 is welded by passing it between rollers 6 and 7. Welding machine 1 is provided with suitable internal circuitry and external timing devices so that when a can's position between roller electrodes 6 and 7 is detected, a signal is fed to the machine to activate it. Thus, as each one of a continuous series of cans passes through roller electrodes 6 and 7, the welding machine is activated, passing current via arms 2 and 3 through the rollers 6 and 7 and into the edges of the sheet forming the can thus welding the seam.

As discussed above, it will be recognized that in order to insure that the weld of the can is of total integrity so that the can will not leak when filled, whether pressurized or not, the welding process must be correctly designed so that a good bond is formed between the two sides of the can. It will be recognized, furthermore, that such a weld of integrity can be formed only if each of a large number of process variables is carefully controlled. Among these variables are: the welding current; the thickness of the metal to be welded; the electrical conductivity between the arms 2 and 3, the rollers 6 and 7, and the pressure of the rollers 6 and 7 on can 4; the surface condition of the rollers 6 and 7 and of the can 4; the inductance of the entire system including the welding generator; and the timing of the can and its speed through the rollers. Furthermore, it will be recognized by those skilled in the art that frequently the welding parameters desirable for the proper welding of cans vary from one end of the seam to the other. Specifically, the beginning of the can, the center of the can, and the end of the can are frequently to be welded at, for example, different current settings.

It is elementary physics that the voltage across a resistive circuit element is proportional to the current passing through the element times its resistance. It is, furthermore, clear that the heat applied to a weld is proportional to the current squared multiplied by the resistance. Finally, it is known that the integrity of the weld depends on, among other things, the heat input. Therefore, the voltage across the welding electrodes is an indication, though not a directly proportional signal, of the integrity of the weld. Therefore, it is known to perform experimentation upon a given welding application so as to determine the minimum and maximum readings found on a voltmeter connected across the weld when a weld of integrity is made.

It has been known in the prior art that a device known as an "Integrating Voltmeter" an exemplified, for example, by the Digimetrics Company's Model NDT 610 is useful for monitoring weld conditions. This instrument integrates a voltage signal over a preset period of time, thus providing a reading in volt-seconds. This is useful in a stitch-welding application, as the integrating period can be so chosen that each stitch is monitored, thus providing a signal indicative of the heat input to each individual stitch. Such a voltmeter can be connected across the electrodes of a welding machine and will give a reading which is indicative of the integrity of the weld. Furthermore, such a device can be provided with suitable controls so that if its reading in practice is above a preset high limit or below a similarly preset low limit, the part welded is rejected by automatic control.

What is not found in the prior art is a means for adapting such a voltmeter to a system in which the desired weld voltage is not constant with respect to the position of the part to be welded, that is, in the can-welding situation, for example, where the welding conditions are desirably different in the middle of the can's seams from those at the ends or, for that matter, where the welding conditions at one end of the can ought to be different from those at the other as well as from those in the middle.

The present invention solves this problem by providing a blanking pulse generator used in combination with a number, preferably 3, of such integrating voltmeters: one each for the beginning, for the middle, and for the end of the seam. By proper circuit design, as exemplified in FIGS. 1 and 2, this deficiency of the prior art can be overcome and a fully automatic system can be devised which monitors different welding currents for the beginning, middle, and end of the can, which rejects improperly welded cans automatically, and which can be manufactured and used with excellent efficiency and reasonable cost.

Referring now to FIG. 1: As discussed above, current passes from welding machine 1 through arms 2 and 3 and rollers 6 and 7 to the seam to be welded of can 4. An internal signal indicating the start of the welding operation is taken from the welding machine and passed into blanking pulse generator 8; a voltage signal is taken off rollers 6 and 7. These signals are passed to the blanking pulse generator 8 which amounts, in this embodiment, to a switching device. The blanking pulse generator sends the voltage signals on to one of integrating voltmeters 10, 11 or 12, depending on which part of the seam is at that time being welded. For example, the circuit may be arranged so that integrating voltmeter 10 is set up to measure the integrity of the weld process during the welding of the beginning of the can; integrating voltmeter 11, the middle; and integrating voltmeter 12, the other end of the can. An alarm 20 is triggered by the exceeding of the maximum or the failure to reach the minimum volt-second requirement of any of the three voltmeters. The alarm can be arranged to ring a bell, flash a light, or blow a siren to attract the attention of the operator, to tell him that defective cans are being produced and so that he can then remedy the problem, whatever it may be. Furthermore, the alarm signal can also be passed to a shift register which keeps track electronically of the position of the bad can in the line so that at the proper time a reject mechanism 22 can be employed to remove the offending can from the production line.

Figure 2:
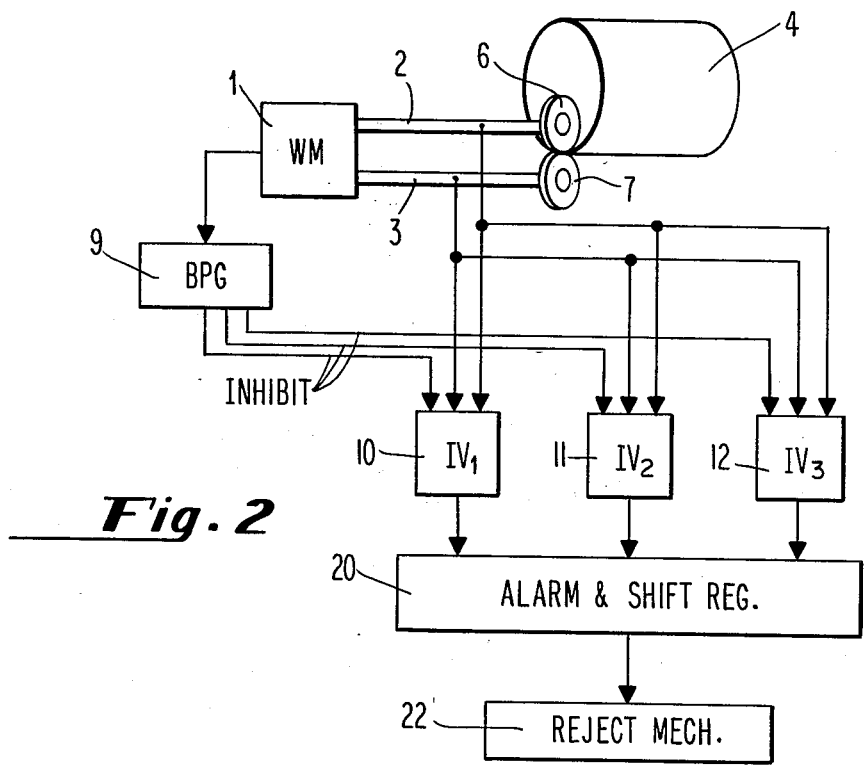
FIG. 2 represents a similar view of a second embodiment of the present invention.

A second form of the invention is shown in FIG. 2. It is essentially similar to that shown in FIG. 1 as to the welding machine 1, the arms 2 and 3, and the rollers 6 and 7. However, here the blanking pulse generator, in this embodiment numbered 9, inasmuch as it is a somewhat different sort of unit from that numbered 8 in the discussion of FIG. 1 above, rather than directing the voltage output from the electrodes to the appropriate integrating voltmeter 10, 11 or 12, instead inhibits their operation. The voltage signal is connected by bus lines across all three integrating voltmeters 10, 11 and 12 at once, and the blanking pulse generator is used to inhibit their operation. For example, integrating voltmeter 11, intended to monitor the voltage across the weld during the welding of the middle of the seam, might find that its lower limit is not reached during the welding of the beginning of the seam. If not inhibited, this would trigger the alarm and reject mechanism. However, the blanking pulse generator in this embodiment is so arranged as to inhibit integrating voltmeter 11 from triggering the alarm due to the voltage signal's not being within the preset limits. Instead, the blanking pulse generator allows only integrating voltmeter 10 to perform this function at this time. Thus, the three voltmeters each reject cans for bad welds made during their specific parts of the welding operation.

Figure 3:
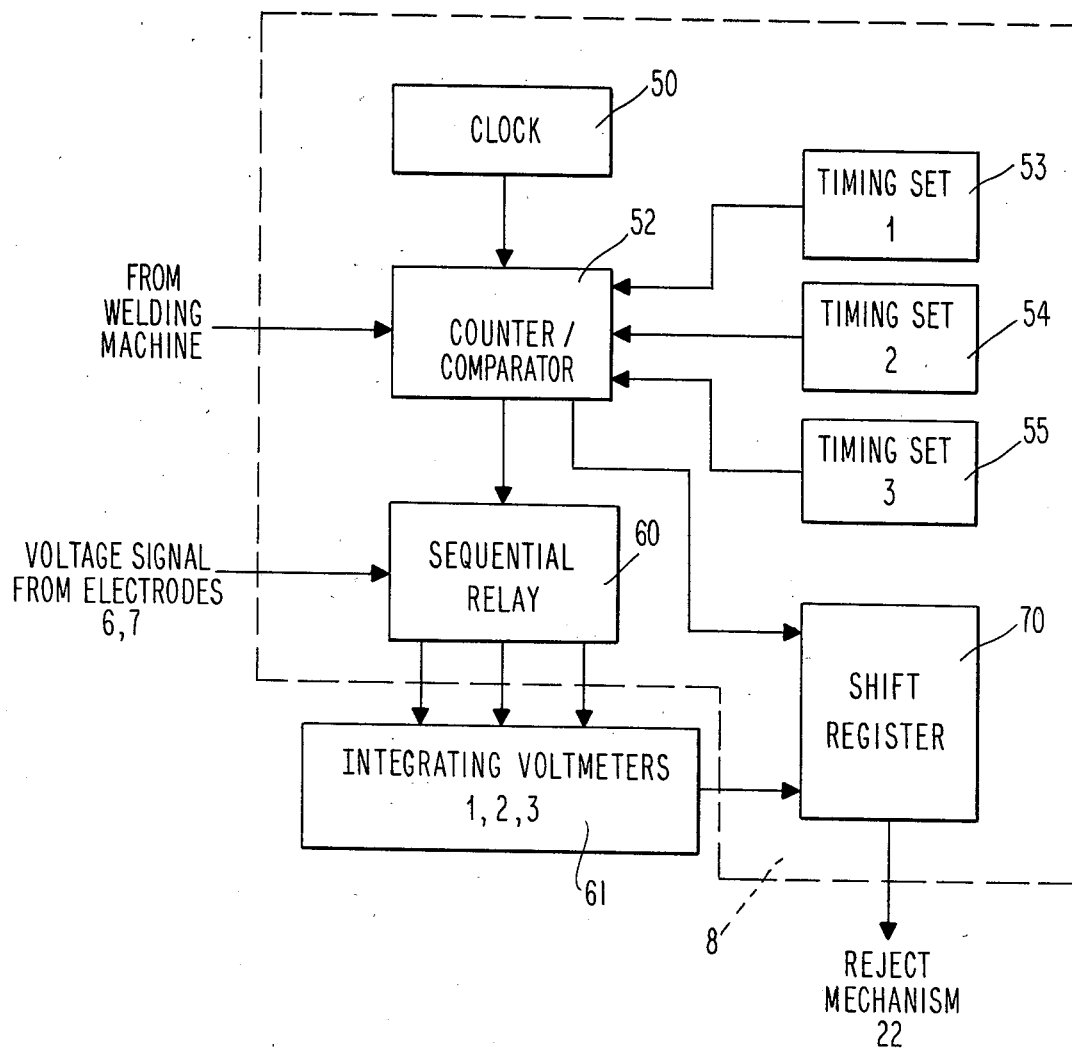
FIG. 3 represents one possible embodiment of a blanking pulse generator useful in connection with the invention.

FIG. 3 shows a block diagram of a blanking pulse generator suitable for use with the welding system of the invention. The blanking pulse generator is labeled 8 inasmuch as it is set up to operate as the blanking pulse generator 8 of FIG. 1, but with slight modification will also operate as the blanking pulse generator 9 of FIG. 2. These modifications will be discussed below.

FIG. 3 shows a possible embodiment of a suitable blanking pulse generator. A clock 50 provides a steady signal to counter/comparator 52. Counter/comparator 52 is activated by a signal from welding machine 1 showing that the can is in position, and the welding operation has, or is about to start. Counter/comparator 52 is provided with three inputs, in the case where three integrating voltmeters are to be used corresponding to three kinds of desired welding conditions, by timing sets 53, 54, 55. These are set by the operator either after experimentation or in accord with previous experience, at the initiation of a run on a given type of can to be welded. Timing set 53 controls the length of time the voltage signal is passed to integrating voltmeter 10, timing set 54 to integrating voltmeter 11, and timing set 55 to integrating voltmeter 12. This is done, as discussed above, by providing counter/comparator 52 with a steady clock signal. The counter/comparator 52 counts the clock pulses, and when the count reaches the point defined by timing set 53, the counter/comparator 52 outputs a signal to a sequential relay 60. This sequential relay 60 may have the same number of steps corresponding to the number of integrating voltmeters to be used, or may have more steps and be reset to zero by the signal from the welding machine 1 which also resets the counter/comparator 52. In either case, the signal from the counter/comparator 52 when input to the sequential relay 60 causes the voltage signal which is controlled by the relay to be passed to the next integrating voltmeter in order. Thus, timing sets 53, 54, 55 are used to set the point at which the counter gives a signal to the sequential relay, which in turn directs the voltage signal from electrodes 6 and 7 to the appropriate integrating voltmeters 61.

Advantageously, the shift register 70 can be combined with the blanking pulse generator 8. The shift register 70, as discussed above, responds to the alarm signal given by the integrating voltmeters 61 and triggers a reject mechanism 22 at some later stage in the welding operation to remove a poorly welded can from the production line. By passing a signal, one per can, from the counter/comparator 52 to the shift register 70, the shift register 70 will be incremented by one every time a can enters the welding process. By passing an alarm signal from the integrating voltmeters 61 indicating that a bad weld has been made, to the shift register 70 and incrementing this count by means of the signal received from the counter/comparator 52, the shift register 70 can be adapted to keep track of the position of an offending can in the production line. Thus, for example, if the reject mechanism 22 is, for example, 8 cans downstream of the welding electrodes, the shift register will count, using the signal from counter/comparator 52, up to eight after an integrating voltmeter 61 has given a signal that a defective can has been produced, and at that point will trigger the reject mechanism 22 to remove the offending can from the line. Clearly, the shift register 70 may be provided with, in this example, up to eight individual shift registers so as to keep track of the position of eight cans so that all eight will be removed in the event that all eight were welded poorly.

Alternatively, the blanking pulse generator could be used as described above in connection with FIG. 2. There, instead of passing the voltage signal to the voltmeter concerned, the voltage signal is connected across all three voltmeters at all times, and instead an inhibit signal is passed to all voltmeters except the one corresponding to the point at which the can is in the welding cycle at a given time, so that an alarm signal will not be given by the wrong voltmeter. In this case, the blanking pulse generator shown in FIG. 3 could readily be adapted. The clock 50, counter/comparator 52, and timing sets 53, 54 and 55 might, in this one embodiment, remain the same. The sequential relay 60 would be the same as well, and controlled in the same manner by the counter in response to the output of the clock 52 and the timing sets 53, 54 and 55, but instead would pass an inhibit signal to the voltmeters except during the time that the voltmeter in question was to be activated. Thus, the sequential relay 60 would be passing inhibit signals to integrating voltmeters 61 at all times except when the voltmeter in question was to be monitoring the voltage signal from electrodes 6 and 7.

In his way, a system of integrating voltmeters and a blanking pulse generator can be designed to satisfy the needs of the art discussed above. Each stitch is individually monitored, and a bad weld of any one stitch will cause rejection of the can. Moreover, the cause of the bad weld is irrelevant to the system; whether a roller is dirty, or the line voltage varies, or any other cause of defect occurs, the result is the same: the heat input to the weld is improper, and the can is rejected.

Other welding applications may require similar, although not identical, arrangements. For example, in some cases a perfectly adequate weld can be made using a single current setting. However, due to heating of the can during welding, thus varying its resistance, the voltage reading may change. A single voltmeter used in conjunction with a blanking pulse generator adapted to blank out the alarm signal at the beginning of the weld is adequate to provide suitable monitoring of such a welding process.

It will be appreciated that other modifications and improvements can be made to the invention as described and that such are well within the skill of the art at the present time. Therefore, the above description of the invention should be construed broadly to cover all that comes within the scope and spirit of the following claims.

I claim:

1. A method for monitoring an electric welding process for welding a series of parts of the type wherein the welding current is applied to the part to be welded by welding electrodes as a series of pulses, comprising the steps of:

integrating the voltage across the welding electrodes over the length of each pulse;
   comparing the value thus obtained to predetermined maximum and minimum limits;
   producing an alarm signal when said value does not fall between said limits;
   using said alarm signal to trigger a reject means for removing the part from the series of parts; and
   controlling the time during which the voltage across the electrodes is compared to said predetermined limits in accordance with the position of the part with respect to the welding electrodes, wherein a blanking pulse generator directs the voltage across the electrodes to a plurality of integrating voltmeters, wherein each said integrating voltmeter is adapted to generate an alarm signal if said voltage does not fall within the predetermined limits, and wherein said blanking pulse generator directs the voltage to the particular integrating voltmeter corresponding to the stage in the welding process at which the voltage across the electrodes is measured.

2. A method for monitoring an electric welding process for welding a series of parts of the type wherein welding current is applied by welding electrodes to the part to be welded as a series of pulses, comprising the steps of:

integrating the voltage across the welding electrodes over the length of each pulse;

comparing the value thus obtained to predetermined maximum and minimum limits;

producing an alarm signal when said value does not fall between said limits;

using said alarm signal to trigger a reject means for removing the part from the series of parts; and controlling the time during which the voltage across the electrodes is compared to said predetermined limits in accordance with the position of the part with respect to the welding electrodes, wherein the voltage across the welding electrodes is directed to each of a plurality of integrating voltmeters, each said voltmeter being adapted to produce an alarm signal when the voltage is not between predetermined limits corresponding to desired welding conditions at a point in the welding process, and wherein the blanking pulse generator is used to prevent any given voltmeter from giving an alarm signal except during the part of the welding process corresponding to the predetermined limits.

3. Apparatus for monitoring a welding process of the type wherein a pulsed current is applied to parts to be welded by welding electrodes, comprising:

a plurality of integrating voltmeters connected in parallel to the electrodes, and adapted to integrate the voltage across the electrodes during each pulse, to compare the value thus derived with preset limits, and to provide an alarm signal when said value is not between said limits;

a blanking pulse generator adapted to prevent any one of said plurality of voltmeters from producing an alarm signal except during the part of the welding process corresponding to said limits; and reject mechanism means adapted to be actuated by said alarm signal.

4. Apparatus for monitoring a welding process of the type wherein a pulsed current is applied to parts to be welded by welding electrodes, comprising:

a plurality of integrating voltmeters adapted to integrate the voltage across the electrodes during each pulse, to compare the value thus derived with preset limits, and to provide an alarm signal when said value is not between said limits;

a blanking pulse generator adapted to prevent any one of said one or more voltmeters from producing an alarm signal except during the part of the welding process corresponding to said limits; and reject mechanism means adapted to be actuated by said alarm signal, wherein the blanking pulse generator directs the voltage across the electrodes to each of the plurality of integrating voltmeters in a sequential order in accordance with the position of the part to be welded with respect to the welding electrodes.

5. Apparatus for welding the seams of each of a stream of cans, by application of a series of pulses of electric current to said cans by electrodes, wherein the current desirably applied to said cans varies along the length of each can, comprising:

an integrating voltmeter adapted to compare the integral of the voltage across said electrodes during each said pulse with predetermined maximum and minimum limits and to provide an alarm signal when the value of said integral is not between said limits;

reject means for removing improperly welded cans from said stream of cans in response to said alarm signal; and blanking pulse generator means adapted to prevent said voltmeter from producing said alarm signal in response to said comparison except during the welding of the portion of the seam of each can corresponding to said predetermined maximum and minimum limits, wherein the variation in current desirably supplied to said electrodes over the length of each can is such that the integral of the voltage across said electrodes during each pulse applied to said can does not fall within said limits at all times during the welding of each such can.

* * * * *